(12) United States Patent
Lyu

(10) Patent No.: US 10,681,308 B2
(45) Date of Patent: Jun. 9, 2020

(54) ELECTRONIC APPARATUS AND METHOD FOR CONTROLLING THEREOF

(71) Applicant: SAMSUNG ELECTRONICS CO., LTD., Suwon-si (KR)

(72) Inventor: Dugin Lyu, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/386,921

(22) Filed: Apr. 17, 2019

(65) Prior Publication Data

US 2019/0320140 A1 Oct. 17, 2019

(30) Foreign Application Priority Data

Apr. 17, 2018 (KR) .................. 10-2018-0044476

(51) Int. Cl.
  *H04N 7/15* (2006.01)
  *G06F 3/0484* (2013.01)
  *H04N 7/14* (2006.01)

(52) U.S. Cl.
  CPC ........... *H04N 7/15* (2013.01); *G06F 3/04842* (2013.01); *H04N 7/141* (2013.01)

(58) Field of Classification Search
  CPC ....... H04N 7/15; H04N 7/141; G06F 3/04842
  See application file for complete search history.

(56) References Cited

U.S. PATENT DOCUMENTS 8,395,653 B2 3/2013 Feng et al.
9,113,032 B1 * 8/2015 Vander Mey ............ H04N 7/15
(Continued)

FOREIGN PATENT DOCUMENTS

JP 2001-67482 A 3/2001
JP 2011-244454 A 12/2011
(Continued)

OTHER PUBLICATIONS

International Search Report (PCT/ISA/210) dated Jul. 18, 2019 issued by the International Searching Authority in counterpart International Application No. PCT/KR2019/004559.
Written Opinion (PCT/ISA/237) dated Jul. 18, 2019 issued by the International Searching Authority in counterpart International Application No. PCT/KR2019/004559.

*Primary Examiner* — Stella L. Woo
(74) *Attorney, Agent, or Firm* — Sughrue Mion, PLLC

(57) ABSTRACT

Disclosed is an electronic apparatus for providing a video conference, and a method of controlling the same. The electronic apparatus includes a plurality of cameras, and a processor configured to execute instructions to: control to obtain, through a first camera from among the plurality of cameras, first video of a plurality of users who perform the video conference, determine a first user who is currently speaking among the plurality of users on a basis of the first video that is obtained through the first camera, control to obtain, through a second camera from among the plurality of cameras, second video of the determined first user, determine a second user who is expected to speak after the first user on a basis of the first video that is obtained through the first camera, control to obtain, through a third camera from among the plurality of cameras, third video of the determined second user, and control to output a screen in which the second video is simultaneously displayed with the third video.

9 Claims, 12 Drawing Sheets

(56) References Cited

U.S. PATENT DOCUMENTS

| | | |
|---|---|---|
| 9,288,437 B2 | 3/2016 | Goto |
| 9,392,221 B2 | 7/2016 | Feng et al. |
| 9,674,243 B2 | 6/2017 | Bader-Natal |
| 2002/0101505 A1 | 8/2002 | Gutta et al. |
| 2011/0093273 A1* | 4/2011 | Lee .................. G10L 15/24 |
| | | 704/270 |
| 2011/0285808 A1 | 11/2011 | Feng et al. |
| 2012/0206561 A1* | 8/2012 | Huang ............... H04N 7/15 |
| | | 348/14.09 |
| 2012/0293606 A1* | 11/2012 | Watson ............ H04N 5/232 |
| | | 348/14.16 |
| 2013/0271559 A1 | 10/2013 | Feng et al. |
| 2014/0063176 A1* | 3/2014 | Modai ............ H04N 5/23219 |
| | | 348/14.05 |
| 2016/0057385 A1 | 2/2016 | Burenius |
| 2018/0376108 A1* | 12/2018 | Bright-Thomas ...... H04N 7/152 |

FOREIGN PATENT DOCUMENTS

| | | |
|---|---|---|
| JP | 5211001 B2 | 6/2013 |
| JP | 5316286 B2 | 10/2013 |
| KR | 10-1508092 B1 | 4/2015 |
| KR | 10-2016-0061773 A | 6/2016 |
| KR | 10-1686833 B1 | 12/2016 |
| KR | 10-2017-0072782 A | 6/2017 |

\* cited by examiner

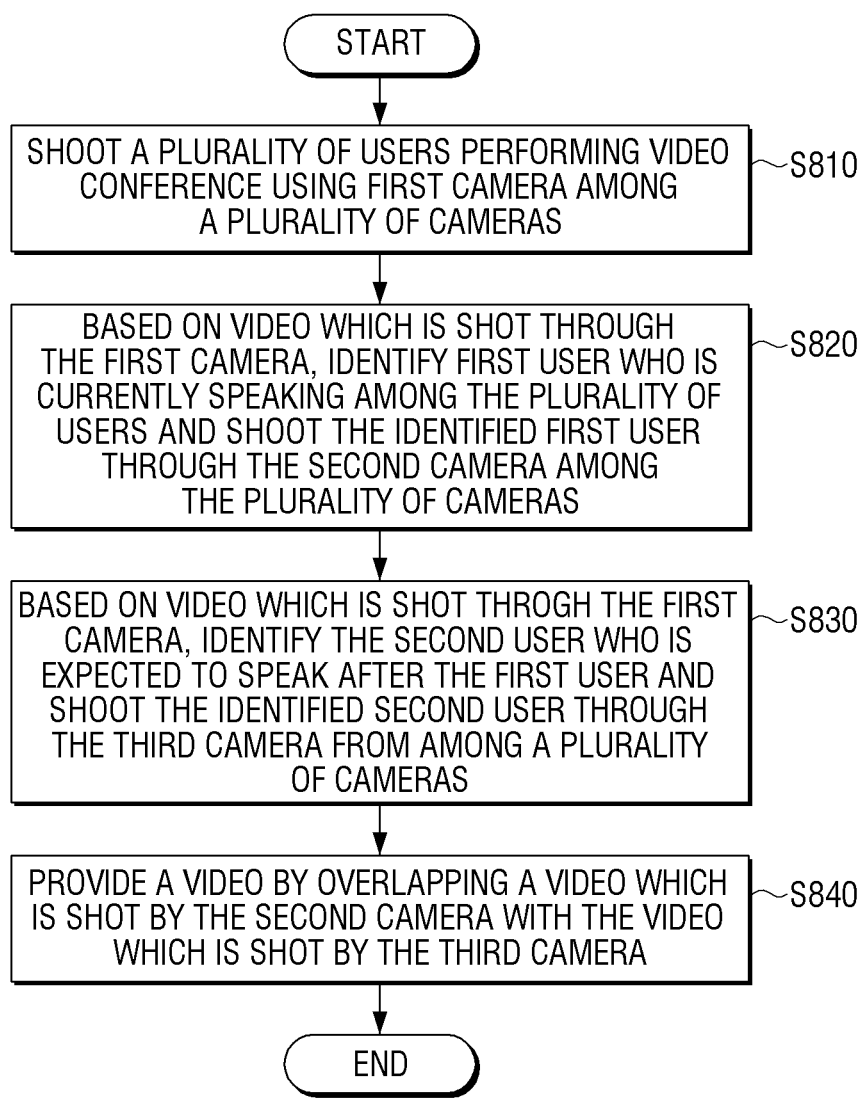

ELECTRONIC APPARATUS AND METHOD FOR CONTROLLING THEREOF

CROSS-REFERENCE TO RELATED APPLICATION

This application is based on and claims priority under 35 U.S.C. § 119(a) to Korean Patent Application No. 10-2018-0044476, filed on Apr. 17, 2018, in the Korean Intellectual Property Office, the disclosure of which is incorporated by reference herein in its entirety.

BACKGROUND

Field

The disclosure relates to an electronic apparatus and a method for controlling the same and, more particularly, to an electronic apparatus providing a video conference and a controlling method thereof.

Description of Related Art

Recently, with the development of electronic technology, various electronic apparatuses satisfying consumer needs have been developed. In particular, an electronic apparatus for providing a video conference (e.g., video conferencing function or operation) has been developed.

Here, a video conference means a teleconference that is performed by people located at remote locations through a video and a voice communication network in an atmosphere as if the people are in the same place.

The related art electronic apparatus providing a video conference provides a video that shoots or captures the entire conference room in which the video conference is performed, or provides a video that shoots or captures a person who is speaking.

When a video that shoots the entire conference room is provided, and in particular, when a video conference is performed in a large conference room, there is a problem that a speaking person is displayed to be excessively small.

In addition, in the case of providing a video that shoots a person who is speaking, when the speaking person is changed, a camera is rotated to shoot the new speaking person. In this case, there is a problem that the speaking person is not included in a video for a few seconds.

SUMMARY

Provided is an electronic apparatus capable of, when a speaking person is changed, providing a video that shoots or captures the changed (or new) speaking person, i.e., a user who newly speaks, by allocating a camera to a user who is expected to speak after a user who is currently speaking.

In accordance with an aspect of the disclosure, an electronic apparatus for performing a video conference includes: a plurality of cameras, and a processor configured to execute instructions to: control to obtain, through a first camera from among the plurality of cameras, first video of a plurality of users who perform the video conference, determine a first user who is currently speaking among the plurality of users on a basis of the first video that is obtained through the first camera, control to obtain, through a second camera from among the plurality of cameras, second video of the determined first user, determine a second user who is expected to speak after the first user on a basis of the first video that is obtained through the first camera, control to obtain, through a third camera from among the plurality of cameras, third video of the determined second user, and control to output a screen in which the second video is simultaneously displayed with the third video.

In accordance with an aspect of the disclosure, a method for controlling an electronic apparatus includes: obtaining, through a first camera from among a plurality of cameras, a plurality of users who perform the video conference; determining a first user who is currently speaking among the plurality of users on a basis of the first video that is captured through the first camera; obtaining, through a second camera from among the plurality of cameras, second video of the determined first user; determining a second user who is expected to speak after the first user on a basis of the first video that is obtained through the first camera; obtaining, through a third camera from among the plurality of cameras, third video of the determined second user; and outputting a screen in which the second video is simultaneously displayed with the third video.

In accordance with an aspect of the disclosure, a non-transitory computer-readable recording medium has recorded thereon a program executable by a computer for performing the method.

In accordance with an aspect of the disclosure, an electronic apparatus for providing a video conference includes: a memory; and a processor configured to execute instructions to: obtain first video, captured through a first camera, of a plurality of users who perform the video conference, determine a first user who is currently speaking among the plurality of users on a basis of the first video, control to obtain, through a second camera, second video of the determined first user, determine a second user who is expected to speak after the first user, and control to obtain, through a third camera, third video of the determined second user.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a flowchart to describe a control method for the electronic apparatus according to an embodiment.

DETAILED DESCRIPTION

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and context and technological common sense of those skilled in the related art.

While describing embodiments, if it is determined that the specific description regarding a known technology or configuration unnecessarily obscures the gist of the disclosure, the specific description is shortened or omitted. Further, it is understood that expressions such as "at least one of," when preceding a list of elements, modify the entire list of elements and do not modify the individual elements of the list.

Hereinafter, embodiments will be described in detail with reference to the accompanying drawings and the descriptions of the accompanying drawings, but the disclosure is not limited to embodiments described herein.

Figure 1:
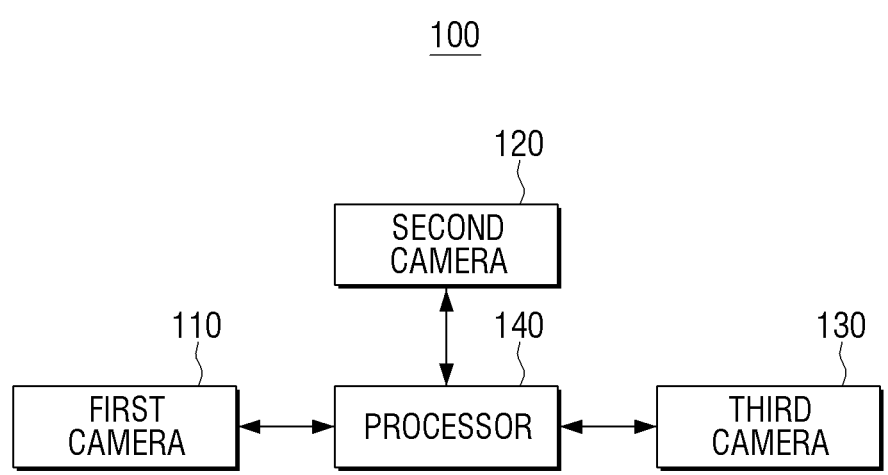
FIG. 1 is a block diagram provided to describe an electronic apparatus according to an embodiment.

FIG. 1 is a block diagram provided to describe an electronic apparatus 100 according to an embodiment.

Referring to FIG. 1, an electronic apparatus 100 according to an embodiment may include a first camera 110, a second camera 120, a third camera 130, and a processor 140.

The first to third cameras 110, 120, and 130 may shoot (e.g., capture or obtain images of) various objects.

In particular, the first camera 110 may shoot a plurality of users who perform a video conference. For example, if a video conference is in progress in a conference room, the first camera 110 may shoot a plurality of users present in the conference room. For this purpose, the electronic apparatus 100 may be provided at a position where the plurality of users present inside the conference room may be shot.

The second camera 120 may shoot a first user who is speaking, from among the plurality of users performing the video conference.

The third camera 130 may shoot a second user who is expected to speak after the first user who is currently speaking among a plurality of users who are performing the video conference.

The processor 140 controls the overall operation of the electronic apparatus 100. For this purpose, the processor 140 may include one or more of a central processing unit (CPU), an application processor (AP), a communication processor (CP), etc.

The processor 140 may shoot (e.g., control to shoot or capture) the plurality of users who perform video conference using the first camera 110. For example, if the video conference is in progress in the conference room, the processor 140 may shoot the plurality of users present in the conference room using the first camera 110. Here, the video that is shot through the first camera 110 may include all users who are performing the video conference at a particular location.

The processor 140, based on a video that is shot through the first camera 110, may identify the first user who is currently speaking, from among the plurality of users who perform the video conference (e.g., the plurality of users present at one location among the remote locations of the video conference).

By way of example, the processor 140 may identify a mouth shape change of the plurality of users in a video that is shot through the first camera 110, and identify a user whose mouth shape change is equal to or greater than a predetermined threshold value as the first user who is currently speaking.

For example, when a mouth shape of a specific user in the video that is shot through the first camera 110 keeps changing, the processor 140 may identify the user as the first user.

The processor 140 may recognize faces of the plurality of users by applying a face recognition algorithm to the video that is shot through the first camera 110. The processor 140 may extract a mouth shape from the recognized face, and then identify the change in the extracted mouth shape. However, it is understood that one or more other embodiments are not limited thereto. For example, the processor 140 may identify the change of the mouth shape of the plurality of users by applying the mouth shape recognition algorithm to the video that is shot through the first camera 110.

In addition, the processor 140 may identify a change in the gestures of the plurality of users in the video that is shot through the first camera 110, and identify the user whose change in the gesture is equal to or greater than a predetermined threshold value as the first user.

For example, in a case where a specific user performs a gesture of moving the hand or a gesture of standing from a seat or the like, in the video that is shot through the first camera 110, the processor 140 may identify the user performing the gesture as the first user.

The processor 140 may recognize a motion of a plurality of users by applying a motion tracking algorithm to the video that is shot through the first camera 110. The processor 140 may identify the change of the gesture through the change of the recognized motion.

In addition, the processor 140 may identify a gaze of the plurality of users (or a gaze of at least one of the plurality of users, or a gaze of a predetermined number of the plurality of users) who are performing a video conference, and may identify (e.g., determine) a user who is present in a direction of the gaze of the plurality of users, as the first user.

For example, in the case where the plurality of users' gaze is heading to a specific direction in the video that is shot through the first camera 110, a user located in the specific direction may be identified as the first user.

The processor 140 may recognize the gaze of the plurality of users by applying the gaze recognition algorithm to the video that is shot through the first camera 110.

The method of identifying a user who is currently speaking based on at least one of the change of the mouth shape, the change of the gesture, or the gaze direction of the plurality of users is exemplary, and it is understood that one or more other embodiments are not limited thereto. That is, the electronic apparatus 100 according to an embodiment may identify the user who is currently speaking by various methods. For example, the electronic apparatus 100 may further include a microphone (or plurality of microphones), and identify the currently speaking user by tracking a location where the user's voice is received through the microphone.

The processor 140 may shoot the identified first user, that is, the user who is currently speaking, through the second camera 120.

When the first user who is currently speaking is not identified, the processor 140 may control the second camera 120 to shoot a location (e.g., predetermined location or default location) where the first speaking is mainly performed in the internal space of the conference room in which the video conference is performed.

For example, in a case where initial speaking is mainly performed in the vicinity of a podium in the internal space of the conference room where the video conference is performed, the processor 140 may control the second camera 120 to shoot the vicinity of the podium.

For this purpose, the electronic apparatus 100 according to an embodiment may store a video conference history. Here, the video conference history may include information about the location where the initial speaking is performed in the internal space of the conference room, or the like.

The processor 140, based on the video that is shot through the first camera 110, may identify the user (second user) who is expected to speak after the first user.

Specifically, the processor 140 may identify the gaze of the first user on the video that is shot through the first camera 110, and identify the user who is present in the direction of the gaze of the first user as the second user. More specifically, the processor 140 may identify a user who is present in a direction of the gaze of the first user for a predetermined time or longer as the second user, from the video that is shot through the first camera 110.

The processor 140 may identify the gaze of the first user by applying the gaze recognition algorithm to the video that is shot through the first camera 110.

In addition, the processor 140 may identify the gesture of the first user from the video that is shot through the first camera 110, and if it is identified or determined that the first user makes a gesture to point out a specific direction, the processor 140 may identify the user who is present in the specific direction as the second user.

For example, when the first user makes a motion to indicate a specific direction by raising an arm, the processor 140 may identify the user who is present at the direction indicated by the first user as the second user.

The processor 140 may recognize a motion of the first user by applying the motion tracking algorithm to the video that is shot through the first camera 110.

The processor 140 may identify the gestures of the plurality of users from the video that is shot through the first camera 110, and if it is identified or determined that at least one user makes a gesture to raise a hand from among the plurality of users, the processor 140 may identify the user who makes the gesture of raising the hand as the second user.

For this purpose, the processor 140 may identify the gestures of the plurality of users by applying the motion tracking algorithm to the video that is shot through the first camera 110.

When at least one user is called from among the plurality of users by the first user, the processor 140 may identify the user having the called name as the second user.

Specifically, when at least one of the plurality of users is called by the first user, the processor 140 may identify information on the face matched to the called name among pre-stored information on the faces and names of the plurality of users, and identify the user corresponding to the identified information on the face as the second user.

For this purpose, the electronic apparatus 100 according to an embodiment may match the names of respective users to the information on the faces of a plurality of users and store the information.

The processor 140 may identify the second user who is expected to speak after the first user, based on a pre-stored speech order list.

Specifically, the processor 140 may identify the name of the user to speak after the first user through the pre-stored speech order list. Then, the processor 140 may identify information on the face matched to the identified name among the pre-stored information on the faces of the plurality of users. The processor 140 may identify a user corresponding to the identified face information, among the plurality of users included in the video that is shot through the first camera 110, as the second user.

Thereafter, the processor 140 may, through a third camera 130, shoot the identified second user, that is, the second user who is expected to speak after the first user who is currently speaking.

The processor 140 may provide a video by overlapping the video that is shot by the second camera 120 with the video that is shot by the third camera 130.

That is, the processor 140 may provide a video by overlapping the video including the first user who is currently speaking with the video including the second user who is expected to speak after the first user.

As such, the electronic apparatus 100 according to an embodiment may provide a video including not only the first user who is currently speaking, but also the second user who is expected to speak after the first user. Accordingly, users who perform a video conference may more easily and conveniently focus on the video conference.

The processor 140, if it is confirmed that the identified second user starts speaking based on the video that is shot through the first camera 110, may provide the video that is shot by the third camera 130 on an entirety of a screen (e.g., a screen of a display or a screen of a video conferencing application).

Here, the processor 140 may identify that the second user starts speaking when the change of the mouth shape and/or the change of the gesture of the second user is equal to or greater than a preset threshold value. However, this is merely exemplary, and it is understood that one or more other embodiments are not limited thereto. For example, according to another embodiment, the electronic apparatus 100 may further include a microphone (or a plurality of microphones), and when the second user's voice is received through the microphone, the processor 140 may identify that the second user starts speaking.

While in the present embodiment, the second user is identified via the video that is shot through the first camera 110, it is understood that one or more other embodiments are not limited thereto, and the second user may be identified via the video that is shot through the second camera 120 (e.g., by identifying a gaze direction or gesture of the first user) or a combination of the video that is shot through the first camera 110 and the video that is shot through the second camera 120. Further, while in the present embodiment, the processor 140 may identify that the second user starts speaking via the video that is shot through the first camera 110, it is understood that one or more other embodiments are not limited thereto, and the processor 140 may identify that the second user starts speaking via the video that is shot through the third camera 130 or a combination of the video that is shot through the first camera 110 and the video that is shot through the third camera 130.

As described above, the electronic apparatus 100 according to an embodiment may allocate, in advance, a camera to the second user who is expected to speak after the first user who is speaking, and when the speaking person is changed, the electronic apparatus 100 may immediately provide a video that shoots the second user who newly speaks.

Accordingly, a user who performs a video conference may focus on the video conference more easily and conveniently.

It is understood that the electronic apparatus 100 as described above can be implemented as a single device having a plurality of cameras (e.g., a mobile phone, a mobile device, a video conferencing device including a processor and plural cameras, a multi-camera device including a processor) or as a plurality of devices (e.g., a computing device such as a mobile phone, a computer, a workstation, a server, etc., and a plurality of cameras or camera devices).

Figure 2A:
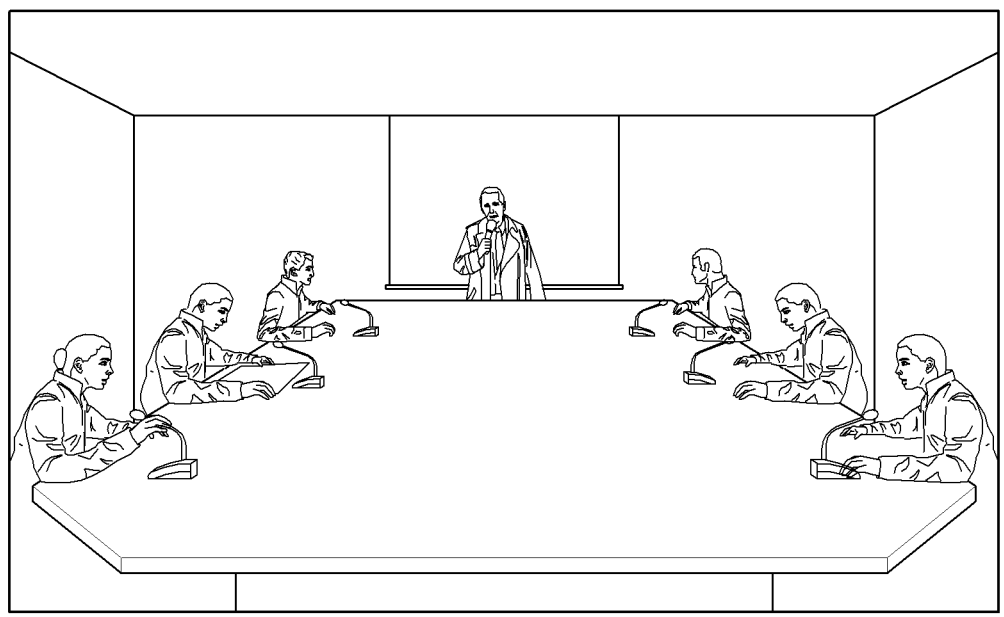
FIG. 2A is a view provided to describe a video which is shot through a camera according to an embodiment.
Figure 2B:
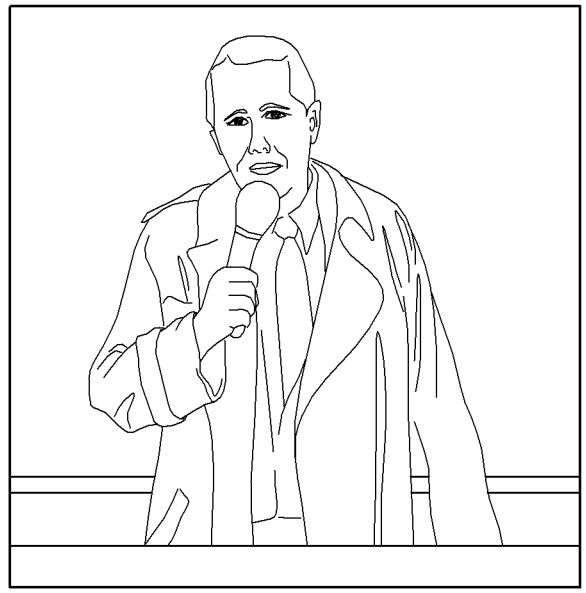
FIG. 2B is a view provided to describe a video which is shot through a camera according to an embodiment.
Figure 2C:
FIG. 2C is a view provided to describe a video which is shot through a camera according to an embodiment.

FIGS. 2A, 2B, and 2C are views provided to describe a video that is shot through a camera according to an embodiment.

FIG. 2A is a view to describe a video that is shot through the first camera 110. The video that is shot through the first camera 110 may include a plurality of users who perform a video conference.

For example, referring to FIG. 2A, when the video conference is performed in a conference room, a plurality of users present in the internal space of the conference room may be included in the video that is shot through the first camera 110. Here, it is preferable that the video that is shot through the first camera 110 include all users who perform a video conference. For this purpose, the electronic apparatus 100 according to an embodiment may be provided at a location where all users who perform the video conference may be shot (i.e., captured).

FIG. 2B is a view provided to describe a video that is shot through the second camera 120. The video that is shot through the second camera 120 may include the first user who is currently speaking from among a plurality of users who perform the video conference.

For example, referring to FIG. 2B, when a user holding a microphone with the hand is identified as the first user who is currently speaking, among a plurality of users performing a video conference, the video that is shot through the second camera 120 may include a user holding a microphone with the hand.

As described above, the first user may be identified based on at least one of the mouth shape change, the gesture change, the gaze direction, or the like of the plurality of users included in the video that is shot through the first camera 110.

FIG. 2C is a view provided to describe a video that is shot through the third camera 130 according to an embodiment. The video that is shot through the third camera 130 may include the second user who is expected to speak after the first user who is currently speaking among a plurality of users who are performing a video conference.

For example, referring to FIG. 2C, if it identified that a user who is touching a microphone to turn on a microphone among a plurality of users performing a video conference is the second user who is expected to speak after the first user, the video that is shot through the third camera 130 may include a user touching the microphone with the hand.

As described above, the second user may be identified based on at least one of the direction of the first user's gaze, the gesture of the first user and/or the gesture of the second user included in the video that is shot through the first camera 110, or the name called by the first user.

Figure 3:
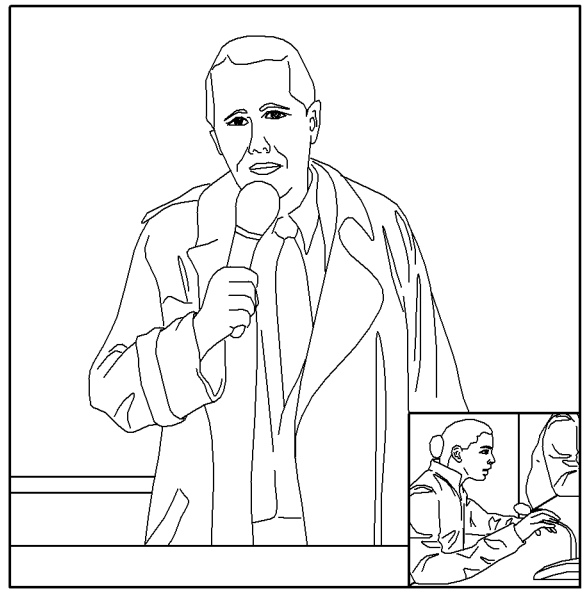
FIG. 3 is a view provided to describe a video including a user who is currently speaking and a user who is expected to speak next according to an embodiment.

FIG. 3 is a view provided to describe a video including a user who is currently speaking and a user who is expected to speak next according to an embodiment.

The processor 140 may provide a video by overlapping the video that is shot through the second camera 120 with the video that is shot through the third camera 130.

For example, when the video including the first user is shot by the second camera 120 as shown in FIG. 2B, and the video including the second user is shot by the third camera 130 as shown in FIG. 2C, the processor 140 may overlap the image shown in FIG. 2B with the image shown in FIG. 2C as shown in FIG. 3.

That is, the processor 140 may provide the video including the first user who is currently speaking and the second user who is expected to speak after the first user.

Figure 4:
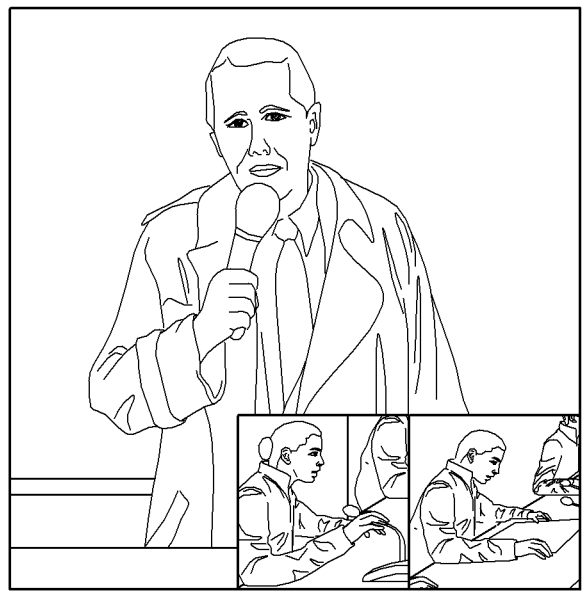
FIG. 4 is a view to describe a video to be provided in a case where there are a plurality of users who are expected to speak after the user who is currently speaking according to an embodiment.

FIG. 4 is a view to describe a video to be provided in a case where there are a plurality of users who are expected to speak after the first user who is currently speaking according to an embodiment.

The processor 140, as described above, may identify the second user who is expected to speak after the first user, based on at least one of the gaze direction of the first user, the gesture of the first user and/or the gesture of the second user, the name called by the first user, or the like, included in the video that is shot through the first camera 110.

Meanwhile, in some cases, the processor 140 may identify at least two or more users as users to speak after the first user. For example, in the case where the first user makes a gesture pointing to two or more users respectively, when the first user calls two or more users, or the like, the processor 140 may identify the at least two or more users as the user to speak after the first user.

In this case, the processor 140 may control the plurality of cameras to shoot at least two users who are expected to speak after the first user respectively.

The electronic apparatus 100 according to an embodiment may further include a fourth camera, in addition to the first to third cameras.

That is, the processor 140, if two users are identified as users who will speaker after the first user, may shoot two users through each of the third camera 130 and the fourth camera.

Accordingly, as shown in FIG. 4, the processor 140 may overlap the video including the first user who is currently speaking with the video that shoots each of the plurality of users who are expected to speak after the first user, and provide the video.

Meanwhile, FIG. 4 shows an embodiment in which two users are identified as a user to speak after the first user. In some cases, if three users are identified as users to speak after the first user, the processor 140 may overlap the video that shoots each of the three users and provide the video. It is understood that one or more other embodiments are not limited to a specific number of identified users to speak after the first user, and are not limited to a specific number of cameras.

Figure 5:
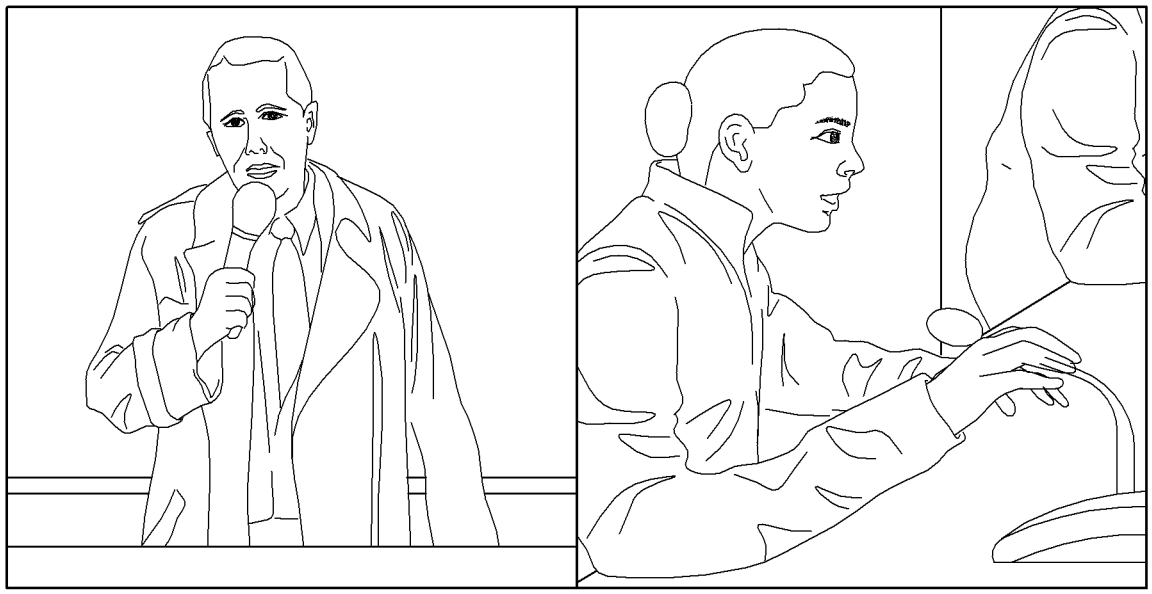
FIG. 5 is a view to describe a video to be provided in a case where there are a plurality of users who are currently speaking according to an embodiment.

FIG. 5 is a view to describe a video to be provided in a case where there are a plurality of users who are currently speaking according to an embodiment.

As described above, the processor 140 may identify the user who is currently speaking based on the mouth shape change, the gesture change, and/or the gaze direction of a plurality of users in the video that is shot through the first camera 110.

In some cases, the processor 140 may identify at least two or more users as users who are currently speaking. For example, if each mouth shape of two or more users changes by a predetermined threshold value or more, the processor 140 may identify the at least two or more users as the currently speaking users.

The processor 140 may control the plurality of cameras to shoot at least two or more users who are currently speaking, respectively.

For this purpose, the electronic apparatus 100 according to an embodiment of the disclosure may further include, in addition to the first to third cameras, a fourth camera.

That is, when two users are identified as the users who are currently speaking, the processor 140 may shoot the two users through the second camera 120 and the fourth camera, respectively.

As illustrated in FIG. 5, the processor 140 may provide a video including a plurality of users who are currently speaking.

FIG. 5 illustrates a case where two users are identified as the currently speaking users according to an embodiment. It is understood that one or more other embodiments are not limited to a specific number of currently speaking users that are identifiable and that can be shot. For example, according to another embodiment, if three users are identified as currently speaking users, the processor 140 may provide a video shooting three users respectively.

In the present embodiment, when the second user is identified through the method of identifying the second user as described above, the processor 140 may overlap the video that shoots the second user identified through the second camera 120 with the video including the plurality of current speaking users and provide the video.

Figure 6A:
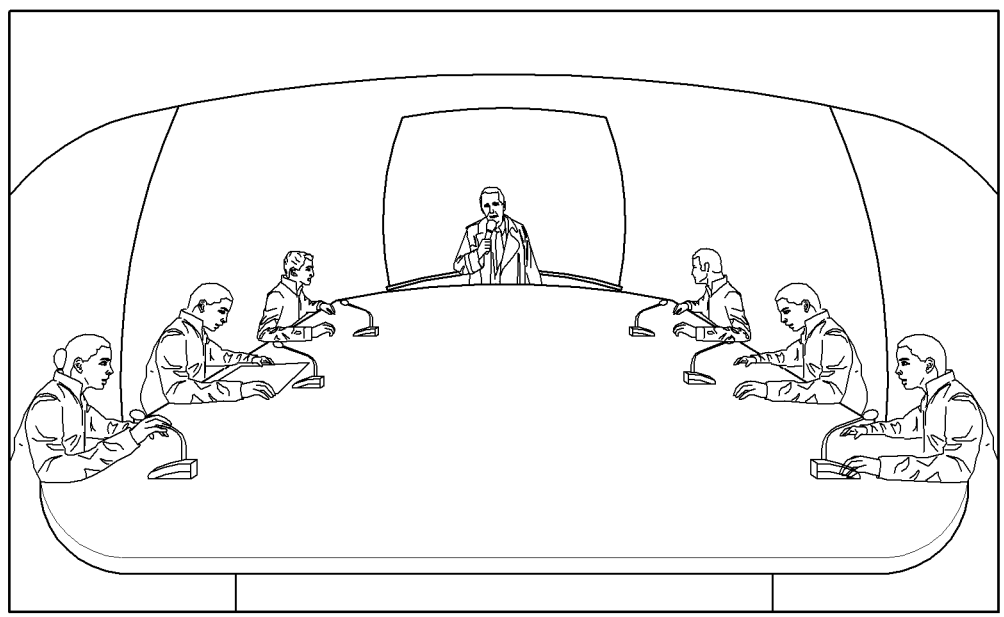
FIG. 6A is a view to describe an embodiment in a case where the electronic apparatus provide a virtual reality (VR) video according to an embodiment.
Figure 6B:
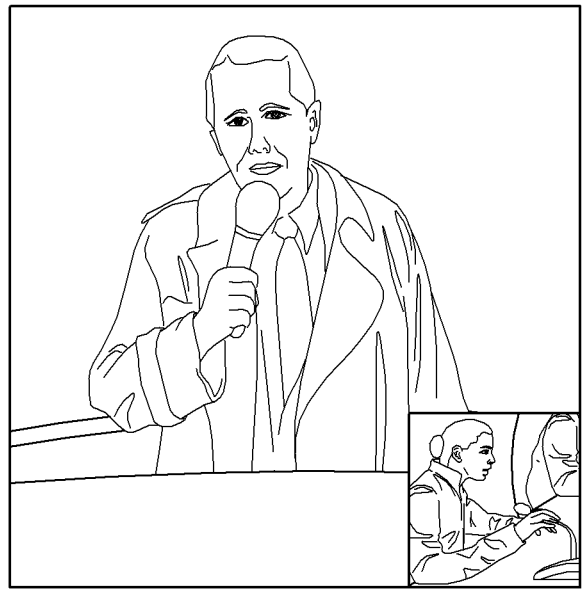
FIG. 6B is a view to describe an embodiment in a case where the electronic apparatus provide a virtual reality (VR) video according to an embodiment.

FIGS. 6A and 6B are views to describe an embodiment in a case where the electronic apparatus provides a virtual reality (VR) video according to an embodiment.

The electronic apparatus 100 according to an embodiment may provide a virtual reality (VR) video. Here, the VR video may refer to video that is shot using a camera having a wide angle (for example, 180-degree camera, 360-degree camera, etc.).

For this purpose, at least one of the plurality of cameras of the electronic apparatus 100 may be implemented as a camera with a wide angle (for example, 360-degree camera).

For example, when the first camera 110 is implemented as the 360-degree camera, the video that is shot through the first camera 110, as illustrated in FIG. 6A, may be a VR video.

Accordingly, the electronic apparatus 100 according to an embodiment may grasp the change of gestures and gaze directions of each of the plurality of users attending the conference more precisely than a two-dimensional (2D) video.

Meanwhile, the user who is currently speaking in the video which is shot through the 360-degree camera may be identified through various methods as described above. Specifically, the processor 140 may identify the user who is currently speaking based on at least one of a change in mouth shape, a change in gesture, or a gaze direction of the plurality of users in a video that is shot through the 360-degree camera.

Also, the user who is expected to speak next in the video that is shot through the 360-degree camera may also be identified through various methods as described above. Specifically, the processor 140 may identify the second user who is expected to speak after the first user, based on at least one of the gaze direction of the first user, the gesture of the first user, the gesture of the second user, or the name called by the first user included in the video that is shot through the 360-degree camera.

Accordingly, the electronic apparatus 100 according to an embodiment, as shown in FIG. 6B, may overlap the VR video including the currently speaking first user with the video that captures the second user who is expected to speak after the first user and provide the video.

In the meantime, FIG. 6B illustrates an embodiment in which the second camera and the third camera are implemented as a 360-degree camera in the same manner as the first camera 110, and the videos that capture the first user and the second user are VR videos. However, it is understood that one or more other embodiments are not limited thereto and, in some cases, the second camera and/or the third camera may be implemented as general cameras. In this case, the processor 140 may provide the video as shown in FIG. 3.

FIG. 6B is a view illustrating an example in which there is one user expected to speak after the first user. However, in some cases, at least two or more users may be identified as users who will speak after the first user. In this case, as described above, the processor 140 may overlap the video(s) that capture at least two or more users, respectively, with the video captures the first user and provide the overlapped videos.

Figure 7A:
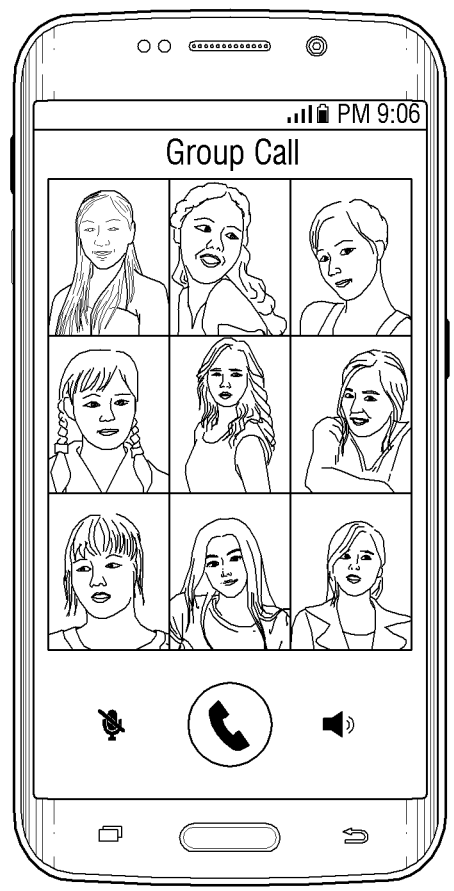
FIG. 7A is a view to describe an embodiment in a case where the electronic apparatus provides a group call function according to an embodiment.
Figure 7B:
FIG. 7B is a view to describe an embodiment in a case where the electronic apparatus provides a group call function according to an embodiment.

FIGS. 7A and 7B are views to describe an embodiment in a case where the electronic apparatus provides a group call function according to an embodiment.

The electronic apparatus 100 according to an embodiment may provide a group call function. Here, the group call function refers to a function through which a plurality of users may perform a call together.

In providing a group call function, the related art electronic apparatus displays all of a plurality of users who are performing a call on a screen.

However, when all the users who are performing the group call function are displayed on the screen, there is a problem that it is difficult to recognize at a time which user is speaking.

In order to address the problem, the processor 140 may identify the currently speaking first user from among a plurality of users performing a group call, and display the identified first user on the full screen.

To be specific, as illustrated in FIG. 7A, the processor 140 may identify a change in a mouth shape of a plurality of users on a screen including a plurality of users performing a group call, and identify the user of which the mouth shape change is greater than or equal to a preset threshold value as the currently speaking first user.

For example, in a screen including a plurality of users, when the mouth shape of a specific user keeps changing, the processor 140 may identify the user as the first user.

In addition (or alternatively), the processor 140 may identify a change in a gesture of a plurality of users on a screen including a plurality of users, and identify a user whose change in the gesture is equal to or greater than a predetermined threshold value as the first user.

In addition (or alternatively), the processor 140 may identify the change of gestures of a plurality of users in the video that is shot through the first camera 110, and identify the user whose change in the gesture is equal to or greater than a predetermined threshold value as the first user.

For example, in a case where a specific user performs a gesture of raising a hand, or the like, on a video that is shot through the first camera 100, the processor 140 may identify the user who performs the gesture as the first user.

When the currently speaking first user is identified, the processor 140 may display the first user on a full screen (or on a predetermined area of the screen). Accordingly, the user performing the group call may easily recognize the user who is currently speaking.

The processor 140 may identify the second user who is expected to speak next among a plurality of users performing a group call, overlap a full screen in which the first user is displayed with the screen including the second user, and display the screen.

Specifically, the processor 140 may identify the gestures of a plurality of users on a screen including the plurality of users, and when it is identified that at least one user among the plurality of users is performing a gesture of raising the hand, the processor 140 may identify the user who performs the gesture of raising the hand as the second user.

In addition, when the first user who is currently speaking calls at least one of the plurality of users, the processor 140 may identify information on the face matched to the called name from among the pre-stored information on the faces of the plurality of users, and identify the user corresponding to the identified information on the face as the second user.

When the second user who is expected to speak after the first user is identified, as illustrated in FIG. 7B, the processor 140 may overlap the video including the second user with the full screen displaying the first user and display the same.

FIG. 8 is a flowchart to describe a control method for the electronic apparatus according to an embodiment.

Referring to FIG. 8, the electronic apparatus may shoot a plurality of users who perform a video conference using the first camera from among a plurality of cameras in operation S810.

For example, when a video conference is in progress in the conference room, the electronic apparatus may shoot a plurality of users who are present in the conference room using the first camera. Here, the video that is shot through the first camera may include all the users who are performing the video conference.

The electronic apparatus may, based on the video that is shot through the first camera, identify the first user who is currently speaking among a plurality of users, and shoot the identified first user through the second camera from among a plurality of cameras in operation S820.

To be specific, the electronic apparatus may identify the user who is currently speaking, based on at least one of the mouth shape change, gesture change, or gaze direction of the users.

The electronic apparatus may identify the second user who is expected to speak after the first user based on the video that is shot through the first camera, and shoot the identified second user through the third camera from among the plurality of cameras in operation S830.

Specifically, the electronic apparatus may identify the second user based on at least one of the gaze direction of the first user, the gesture of the first user, the gesture of the second user, the name called by the first user, or the like.

The electronic apparatus may overlap the video that is shot by the second camera with the video that is shot by the third camera and provide the overlapped videos in operation S840.

As such, the electronic apparatus according to an embodiment provides not only a video including the first user who is currently speaking, but also a video including the second user who is expected to speak after the first user and thus, the users performing the video conference may focus more easily and conveniently on the video conference.

A non-transitory computer readable medium that stores a program that sequentially performs a control method of an electronic apparatus may be provided.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a Solid State Drive (SSD), a Blu-ray disc, a universal serial bus (USB), a memory card, a read only memory (ROM), and the like, and may be provided.

The foregoing embodiments and advantages are merely exemplary and are not to be construed as limiting the disclosure. The present teaching can be readily applied to other types of apparatuses. Also, the description of embodiments is intended to be illustrative, and not to limit the scope of the claims, and many alternatives, modifications, and variations will be apparent to those skilled in the art.

What is claimed is:

1. An electronic apparatus for providing a video conference, the electronic apparatus comprising:
   a plurality of cameras; and
   a processor configured to execute instructions to:
   control to obtain, through a first camera from among the plurality of cameras, first video of a plurality of users who perform the video conference,
   determine a first user who is currently speaking among the plurality of users on a basis of the first video that is obtained through the first camera,
   control to obtain, through a second camera from among the plurality of cameras, second video of the determined first user,
   determine a second user who is expected to speak after the first user on a basis of the first video that is obtained through the first camera,
   control to obtain, through a third camera from among the plurality of cameras, third video of the determined second user, and
   control to output a screen in which the second video is simultaneously displayed with the third video,
   wherein the processor is configured to execute the instructions further to:
   identify a user who is expected to speak after the first user, on a basis of a pre-stored speaking order list;
   determine, from among pre-stored information on faces of the plurality of users, information on a face corresponding to the identified user; and
   determine, as the second user, a user corresponding to the identified information on the face.

2. The electronic apparatus of claim 1, wherein the processor is configured to execute the instructions further to:
   on a basis of the first video, determine, as the first user, a user of which a mouth shape change or a gesture change is determined to be greater than or equal to a preset threshold; or
   on a basis of the first video, determine, as the first user, a user who is present in a determined direction of a gaze of at least one of the plurality of users.

3. The electronic apparatus of claim 1, wherein the processor is configured to execute the instructions further to:
   based on determining, on a basis of the first video that is obtained through the first camera, that the second user starts speaking, control to output the third video that is obtained through the third camera on a full screen.

4. The electronic apparatus of claim 1, wherein the processor is configured to execute the instructions further to:
on a basis of pre-stored video conference history information, determine a location where initial speaking is performed at a place where the video conference is held, and control the second camera to obtain the second video of the identified location.

5. A method for controlling an electronic apparatus, the method comprising:
obtaining, through a first camera from among a plurality of cameras, first video of a plurality of users who perform a video conference;
determining a first user who is currently speaking among the plurality of users on a basis of the first video that is captured through the first camera;
obtaining, through a second camera from among the plurality of cameras, second video of the determined first user;
determining a second user who is expected to speak after the first user on a basis of the first video that is obtained through the first camera;
obtaining, through a third camera from among the plurality of cameras, third video of the determined second user; and
outputting a screen in which the second video is simultaneously displayed with the third video,
wherein the determining the second user comprises:
identifying a user who is expected to speak after the first user, on a basis of a pre-stored speaking order list;
determining, from among pre-stored information on faces of the plurality of users, information on a face corresponding to the identified user; and
determining, as the second user, a user corresponding to the identified information on the face.

6. The method for controlling of claim 5, wherein the determining the first user comprises:
on a basis of the first video, determining, as the first user, a user of which a mouth shape change or a gesture change is determined to be greater than or equal to a preset threshold; or
on a basis of the first video, determining, as the first user, a user who is present in a determined direction of a gaze of at least one of the plurality of users.

7. The method for controlling of claim 5, further comprising:
based on determining, on a basis of the first video that is obtained through the first camera, that the second user starts speaking, outputting the third video that is obtained through the third camera on a full screen.

8. The method for controlling of claim 5, further comprising:
on a basis of pre-stored video conference history information, determining a location where initial speaking is performed at a place where the video conference is held, and controlling the second camera to obtain the second video of the identified location.

9. A non-transitory computer-readable recording medium having recorded thereon a program executable by a computer for performing the method of claim 5.

* * * * *